April 14, 1953          H. A. ROWE          2,634,702
VEHICLE COMPASS
Filed Dec. 9, 1947
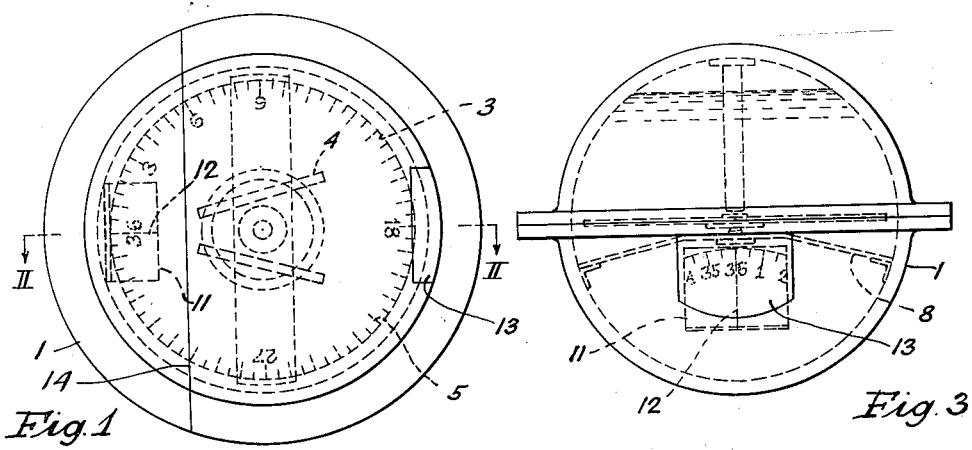
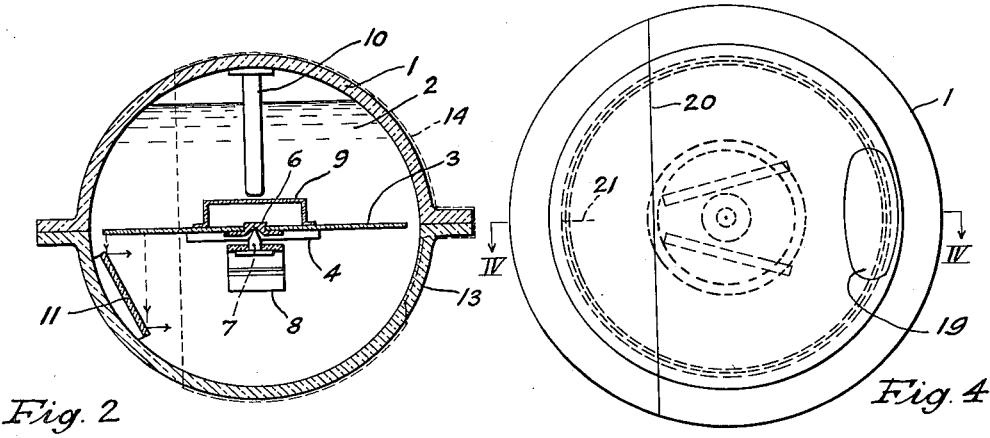
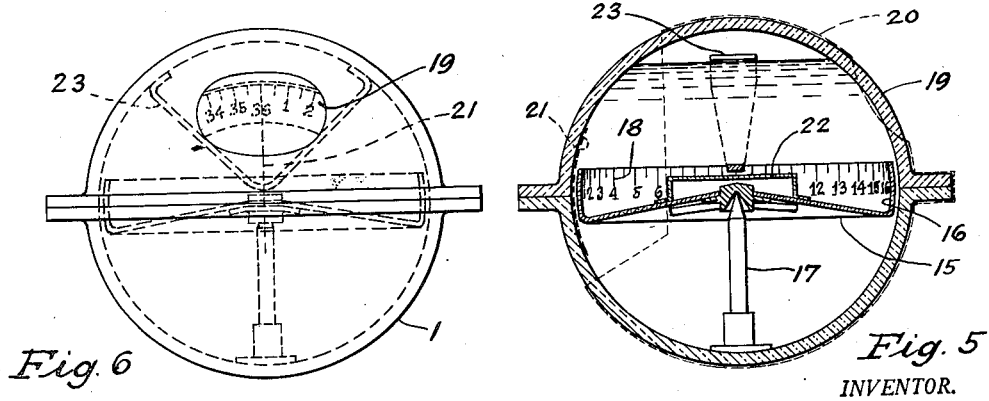
INVENTOR.
Henry A. Rowe
BY
*A. H. Oldham*
ATTORNEY Patented Apr. 14, 1953

2,634,702

UNITED STATES PATENT OFFICE 2,634,702

VEHICLE COMPASS

Henry A. Rowe, Akron, Ohio, assignor to Goodyear Aircraft Corporation, Akron, Ohio, a corporation of Delaware Application December 9, 1947, Serial No. 790,616

2 Claims. (Cl. 116—129)

This invention relates to a compass and in particular to a simple, relatively inexpensive magnetic fluid compass for use in aircraft and other vehicles.

Pilots have complained about the inapt reading of the common rear view type magnetic fluid compass wherein the pilot must imagine himself outside the aircraft looking in toward a compas rose about which he turns. To make the compass readings rotate in one direction, the plane is turned in another direction; this is confusing to students.

It is the general object of the invention to avoid and overcome the foregoing and other difficulties of and objections to prior art practices by making compass readings at the front of the compass rose against a fixed reference mark through a window in the bowl opposite thereof, so that the readings are made in the same direction in which the vehicle turns.

Another object of the invention is to construct a completely self-contained compass on which readings can be made at the front of the compass through a window at the rear in the same direction in which a vehicle turns without complicated and expensive mirror or other arrangements.

The aforesaid objects of the invention, and other objects which will become apparent as the description proceeds, are achieved by making it possible to read the rose graduation at the front through a window in the opaque rear portion of the compass bowl against a transparent front portion thereof provided with a fixed reference mark and which admits sufficient light to the inside of the bowl for reading the compass in the same direction in which the vehicle moves, thus eliminating the pilot's confusion. Instead of a transparent front portion on the bowl an artificial light source may be used.

The invention is applicable for a compass mounted either on, above or below a vehicle operator's eye level, and can be made to suit all three conditions. However, it shall be illustrated for two specific cases, one showing the construction, according to the invention, of a compass to be mounted on or above eye level and the other one showing a construction for mounting it on or below eye level.

For a better understanding of the invention reference should be had to the accompanying drawing, wherein:

Fig. 1 is a bottom view of a compass, according to the invention, adapted to be mounted about on or above eye level.

Fig. 2 is a cross sectional view taken on line II—II of Fig. 1.

Fig. 3 is a rear view of the compass of Figs. 1 and 2.

Figs. 4, 5, and 6 show a modification of the compass shown in Figs. 1, 2 and 3, and which is particularly designed for being mounted on or below eye level and of which:

Fig. 4 is a top view,

Fig. 5 a cross sectional view taken on line IV—IV of Fig. 4, and

Fig. 6 is a view from the window side.

With specific reference to the forms of the invention illustrated in the drawing the numeral 1 indicates a compass bowl of spherical shape made of two halves consisting preferably of transparent plastic material and which are cemented together to form an airtight chamber substantially filled with a suitable fluid 2 of low freezing and high boiling point for dampening oscillations of rose 3. The rose 3 is a flat disk, also preferably made of transparent plastic material, carries magnets 4, and is provided around its circumference with a series of usual graduations 5. With a bearing 6 in its center the rose 3 is freely turnable about a king pin 7 carried by a bridge 8 fastened to bowl 1. In order to reduce bearing friction to a minimum, the weight of the rose may be partially compensated by a central float 9, fixedly attached and sealed thereto. A center post 10, secured to the top of the bowl, protects the rose against unseating.

Since it is the object of the invention to have the compass readings done in the same direction in which a vehicle turns and the compass, in this case, shall be mounted near or rather above eye level, a small mirror 11, provided with a fixed reference line 12, is fastened at a suitable angle below the graduations of the compass rose to reflect the readings through an observation window 13, at the rear of the lower half of the bowl which, except for the window, has an opaque surface or coating 14, shown by dotted lines. The front of the bowl is left largely transparent to admit natural or artificial illumination to the inside of the bowl 1. Thus, the graduations 5 on the rose 3 are reflected in the mirror and can be easily observed through the window against the reference mark 12, as shown in Fig. 3, within a certain vertical angle and, because of the spherical shape of bowl, it appears magnified.

In the modification Figs. 4 to 6, the compass is shown adapted to be mounted on or below eye level and the rose 15 provided with an upward flange 16 is turnable about a king pin 17 which is fastened to the bottom of the bowl. The graduations 18 of the rose are marked on the inside of the flange 16 so that a mirror is not needed.

The window 19, in this case, is placed in the upper half of the bowl and is defined by the surrounding opaque coating 20 (shown in dotted lines) in the rear part thereof, and a reference line 21 is marked opposite the window on the front transparent portion of the bowl. A float 22 is attached to the rose 15 for partially compensating its weight to reduce the bearing friction and a retainer 23, fastened to the top of the bowl, secures the rose against unseating. In Fig. 6 it is shown how the rose reading appears through the window.

The compass constructions illustrated and described above could be readily modified for being usable on, below or above eye level as, for instance, by employing an additional mirror, and extending the window 13 above the rose shown in Figs. 1 to 3. Similarly, the flat disk rose, in Figs. 1 and 3, could be provided with an upwardly and a downwardly extending circumferential flange, both having graduations, as shown in Fig. 5, with the window 13 extending into the upper half of the bowl, making mirrors unnecessary. These modifications, it is believed, will be understood without being specifically illustrated.

It will be recognized from the foregoing description that the objects of the invention have been fully achieved and that such construction not only is very simple but also gives to a pilot a better sense of direction and prevents confusion.

Although the shape of the compass bowl has been illustrated as spherical it should be understood that it could be also made cylindrical or of any other desirable shape. Besides, the choice of the material is not limited to plastics but may include, as well, other suitable materials.

In each of the several forms of the invention described artificial light, such as a small electric bulb, may be incorporated either inside or outside the bowl in association with or in place of the transparent front window.

While in accordance with the patent statutes at least one best known embodiment of the invention has been illustrated and described in detail, it is to be particularly understood that the invention is not limited thereto or thereby, but that the inventive scope is defined in the appended claims.

I claim:

1. A magnetic fluid compass for vehicle use comprising a spherical bowl, the bowl half facing the observer being opaque, except for a window on the bowl surface positioned underneath and adjacent the bowl equator and the opposite bowl half being transparent both above and below the bowl equator for illuminating purposes, a substantially flat graduated transparent rose rotatably mounted in said bowl, the light from the transparent area of the opposite bowl portion passing through the transparent rose, and a single mirror having a fixed reference mark being fastened inside said bowl underneath the rose graduation opposite said window for making readings through said window in association with said rose in the direction in which the vehicle turns.

2. A magnetic compass for vehicle use comprising a fluid-filled spherical bowl having substantially a transparent front half for illuminating the bowl inside and substantially an opaque rear half, a sighting window in said opaque rear half of the bowl surface, a transparent rose having graduations adjacent the circumferential edge thereof being rotatable about the bowl center, and reference means in fixed association with the transparent front half of the bowl for indicating on said rose the angular deviation from a preceding vehicle course, the reading on the front of the compass rose through the bowl being done substantially horizontally in the direction in which the vehicle turns.

HENRY A. ROWE.

References Cited in the file of this patent

UNITED STATES PATENTS

| Number | Name | Date |
|---|---|---|
| 51,290 | Blunt | Dec. 5, 1865 |
| 166,812 | Ritchie | Aug. 17, 1875 |
| 984,929 | Kellner | Feb. 21, 1911 |
| 1,902,497 | Green | Mar. 21, 1933 |
| 1,966,844 | Carbonara | July 17, 1934 |
| 2,018,536 | Salzgeber | Oct. 22, 1935 |
| 2,026,919 | Stright | Jan. 7, 1936 |

FOREIGN PATENTS

| Number | Country | Date |
|---|---|---|
| 7,926 | Great Britain | Apr. 2, 1909 |
| 9,849 | Great Britain | Aug. 19, 1885 |
| 247,561 | Great Britain | Aug. 12, 1926 |
| 374,873 | Germany | May 1, 1923 |
| 544,937 | France | July 7, 1922 |
| 606,937 | Germany | Dec. 13, 1934 |